United States Patent Office 3,296,197
Patented Jan. 3, 1967

---

3,296,197
ORGANOPOLYSILOXANE COMPOSITIONS
Tse C. Wu, Waterford, N.Y., assignor to General Electric Company, a corporation of New York
No Drawing. Filed Dec. 28, 1964, Ser. No. 421,596
6 Claims. (Cl. 260—46.5)

This invention relates to a novel organopolysiloxane composition and to its use. More particularly, this invention relates to an organopolysiloxane composition having the structure:

(1) 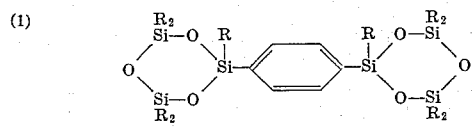

where R is a radical selected from the group consisting of phenyl and tolyl.

Descriptions are found in the prior art of bicyclopolysiloxanes joined by a divalent organic radical. However, in each case, both the substituents on the polysiloxane ring and the divalent organic bonding radical are aliphatic, rather than aromatic. Thus, in U.S. patent 2,762,827—Johannson, the compound having the formula:

(2) 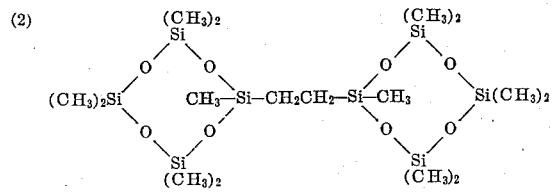

and in U.S. patent 2,766,220—Kantor, compounds having the formulas:

(3) 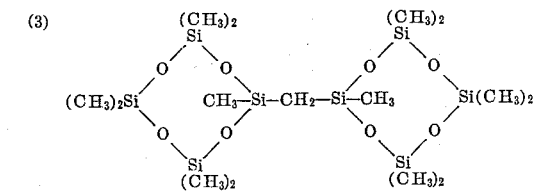

and (4) 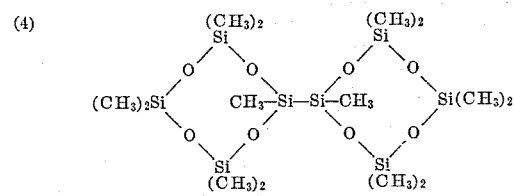

are disclosed. While these compounds are valuable in same cases, because of the alkyl substituents and alkylene bond, they are not useful at high temperatures. On the other hand, organopolysiloxanes substituted with aryl substituents are known to be stable at high temperatures. Thus, a composition similar to those described in Formulas 2, 3 and 4 would be extremely valuable. However, the methods of preparation described in the above-mentioned patents are not adaptable to the production of the corresponding aryl-substituted materials. Unexpectedly, a method has now been found for preparing the compositions of Formula 1, so that the utility of the aryl-substituted organopolysiloxanes at high temperature can be employed.

Briefly, the present invention relates to an organopolysiloxane composition having the formula:

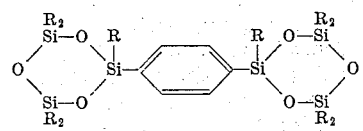

where R is a radical selected from the group consisting of phenyl and tolyl. Further this invention relates to the use of the mentioned compound as a cross-linking agent for high temperature stable aryl-substituted organosilicon polymers.

The material of Formula 1 is prepared according to the following series of reactions:

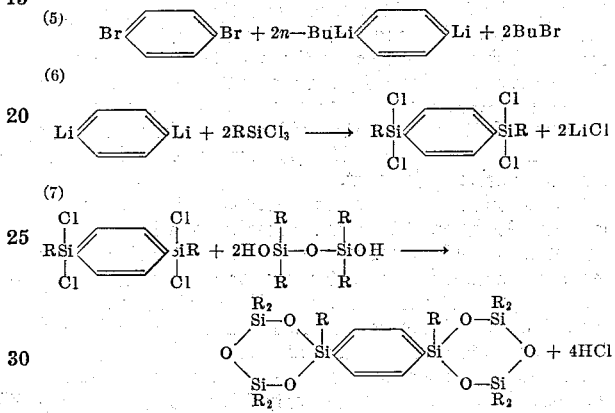

where R is as previously defined and Bu is the butyl radical.

The reaction described in Equation 5 is conducted by adding a solvent solution of the butyl lithium to a solvent solution of the p-dibromobenzene under a nitrogen atmosphere. The concentration of reactants in the solvent should be low, preferably less than two moles per liter as final product and the ratio of reactants should be within ±10% of the stoichiometric requirements. The reaction can be conducted at any temperature from about −30° C. to the reflux temperature of the mixture. At room temperature and above, the available solvents are limited to the hydrocarbons, such as hexane, pentane, heptane, benzene, xylene, and petroleum ether. At temperatures of −10° C. and below, ethers, such as diethyl ether can also be utilized. The slurry is used, without further purification, in the reaction described in Equation 6. The reaction of Equation 6 is exothermic and therefore preferably is conducted at room temperature, or below. The solvent solution of the para-dilithiobenzene is added, to within ±5% of the stoichiometric amount required, to the organotrichlorosilane, which can be undiluted or can be contained in a solvent solution. The solvent, when used, is the same type as described for the reaction of Equation 5.

The compound of Formula 1 is then formed by the reaction of the 1,4 - bis(dichloroorganosilyl)-benzene, formed in Equation 6, with a sym-tetraorganodisiloxane-diol, in the presence of an acid acceptor. The reactants should again be within ±5% of the stoichiometric requirements and the reactants are preferably added simultaneously to the reaction vessel, in dilute solution. The dilute solution is utilized so as to favor the formation of the bicyclic organopolysiloxane. The final concentration should be limited to no more than about two moles of total reactant per liter of solvent, preferably no more than about 0.5 mole of total reactant per liter of solvent. The reaction is preferably accomplished by dissolving each of the compounds in a separate portion of the solvent and adding the two solutions simultaneously, at the same rate, to a third portion of the solvent containing the acid acceptor.

The solvents which can be utilized are essentially any organic solvent which is inert to the reactants under the conditions of reaction. However, the preferred solvents are the hydrocarbons, such as benzene, toluene, xylene, pentane, hexane, heptane, etc. Polar solvents, such as the ethers and ketones, are useable, but not preferred, since they keep the acid acceptor-hydrogen chloride salt in solution during the process. Any of the utilizable solvents can be mixed, e.g., one solvent can be used for one of the reactants and a different solvent for the other reactant.

The acid acceptor which should be utilized can be selected from any of the well-known weak bases which are used as acid acceptors in similar reactions. For example, the tertiary amines, such as pyridine, picoline, 1,4-diazabicyclo(2,2,2)-octane, and the dialkyl anilines can be used. As four moles of hydrogen chloride are generated for each mole of the 1,4-bis(dichloroorganosilyl)benzene, at least four moles of the acid acceptor must be present per mole of this reactant. However, it is preferable to employ the acid acceptor in an amount of from 20 percent to 150 percent in excess of this stoichiometric requirement.

The addition should be completed over a period of no less than ½ hour. There is no maximum addition time, except as limited by economics. Following addition, the reaction mixture is stirred for two or more hours to assure completion of the reaction. The reaction mixture is then filtered and the residue recrystallized several times from toluene to form the purified product.

Specific examples of the various described reactions will now be given to more clearly illustrate the preparation of the composition of the present invention. These examples should not be considered as limiting the invention in any way.

*Example 1*

In this example, the dilithiobenzene produced according to Equation 5 is described. Into a reaction vessel filled with dry nitrogen were placed 177 parts of p-dibromobenzene contained in 1,000 parts of petroleum ether and 1,000 parts of a 1.6 molar n-butyllithium solution in a 3:1 mixture of hexane and pentane. The mixture was heated to reflux for four hours to complete the reaction.

*Example 2*

In this example, the reaction of Equation 6 is shown for the formation of 1,4-bis(dichlorophenylsilyl)benzene. A stoichiometric amount of the organolithium slurry formed in Example 1 was transferred, under nitrogen, over a period of two hours with vigorous stirring, to a reaction vessel containing 150 parts of phenyltrichlorosilane. During the addition and stirring, a great deal of heat was evolved due to the exothermic reaction. The reaction mixture was stirred for two additional hours following the addition and was then filtered to remove the water-soluble solids. The solvent was removed from the filtrate by distillation and a crude product was obtained, by fractional distillation, boiling at about 225° C. at 0.5 mm. The crude product was fractionated in a Todd column at 3 mm. to give 28.3 parts of purified product boiling at 219–220° C. at 3 mm.

The structure of the material, as determined from the infrared spectrum, was consistent with the formula:

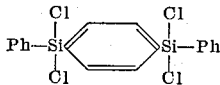

where Ph is the phenyl radical.

*Example 3*

In this example, a portion of the material formed in Example 2 was reacted with sym-tetraphenyldisiloxanediol, in the presence of pyridine, to produce a compound of Formula 1. The reaction equipment utilized in this example was oven-dried and all solvents were sodium treated to remove any traces of water. Five parts of pyridine and 100 parts of anhydrous diethyl ether were placed in a reaction vessel. To the vessel were added, simultaneously, a first solution containing 4.3 parts of 1,4-bis(dichlorophenylsilyl)benzene in 50 parts of diethyl ether and a second solution containing 8.3 parts of sym-tetraphenyldisiloxanediol in 50 parts of diethyl ether. The addition was carried out over a period of 45 minutes, while stirring vigorously at room temperature, and stirring was continued for an additional five hours. The reaction mixture was filtered and the residue cooled, dried, and treated in refluxing toluene. A colorless solution formed on top after refluxing was completed and this solution was decanted into a container, where colorless crystals formed. These crystals were recrystallized twice from toluene and yielded white solids melting at 255–257° C. An infrared spectrum of these white crystals showed a strong band at 9.8 microns, indicative of a cyclotrisiloxane structure and a weak band at 12.1 microns, indicative of a silphenylene bond, consistent with the structure:

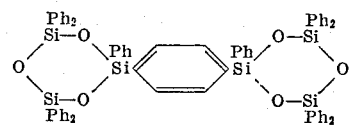

where Ph is the phenyl radical.

One part of this compound was heated with 15 parts of toluene at 125° C. A quantity of a 0.04 percent potassium hydroxide solution, sufficient to provide 40 p.p.m. of the hydroxide, based on the bicyclic compound, was then added. The solution was stirred for a period of two hours while the solvent was allowed to evaporate. The residue was a viscous liquid which, on cooling to room temperature, became a brittle solid. This solid, which could be ground into a powder, had a melting range of about 70°–80° C., and consisted of recurring units of the structure:

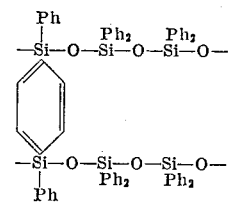

where Ph is the phenyl radical. The structure was confirmed by an infrared spectrum of the product which showed no silanol, weak bands at 8.75, 9.75, and 12.2 microns, indicative of silphenylene bonds, and a band at 9–9.5 microns, indicative of an organopolysiloxane.

*Example 4*

In this example, the bicyclic compound of Formula 1 was prepared where R was the m-tolyl radical. Into a reaction vessel were placed 15 parts of pyridine and 350 parts of benzene. With stirring, two solutions were simultaneously added to the benzenepyridine mixture. The first solution contained 13.7 parts of 1,4-bis(dichloro-m-tolylsilyl)benzene, prepared in a manner similar to that shown in Example 3, in 175 parts of benzene. The second solution, of equal volume with the first, consisted of 28.6 parts of sym-tetra-m-tolyldisiloxanediol. The solutions were added over a period of 30 minutes and the reaction mixture was then stirred for an additional five hours, all at room temperature. The water-soluble solids were filtered from the reaction mixture and the solvent distilled from the filtrate. The residue resulting from the distillation was extracted with toluene. The remaining insoluble solids were washed with methanol and recrystallized twice from ethyl acetate. This yielded 8 parts of solids, melting at 169–172.5° C., which had a structure consistent with the formula:

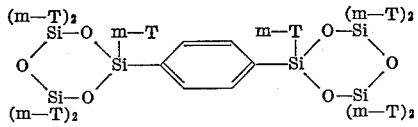

where m—T is the meta-tolyl radical.

A quantity of one part of this bicyclic compound was melted at 180° C. and to it was added sufficient freshly prepared potassium naphthalene solution to give an equivalent of 40 p.p.m. of potassium hydroxide, based on the bicyclic compound. Over a course of 15 minutes, the product was completely gelled. The structure of the gel was consistent with the formula:

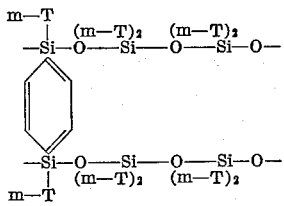

where m—T is the meta-tolyl radical.

Thus, it can be seen that when the product of Formula 1 is heated in the presence of catalytic amounts of a polymerization catalyst, a polymer results having recurring units of the formula:

(8)
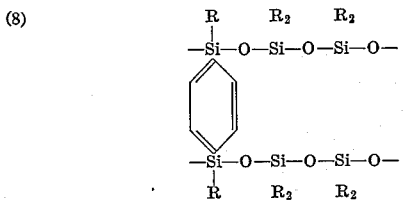

where R is as previously defined. Among the catalysts which can be utilized for this polymerization are potassium hydroxide, sodium hydroxide, lithium hydroxide, cesium hydroxide, rubidium hydroxide and potassium naphthalene. The amount needed is approximately equivalent to 40 p.p.m. of potassium hydroxide, based on the bicyclic compound. The bicyclic compound of Formula 1 can be polymerized either while molten, as shown in Example 4, or in a high boiling solvent solution, as in Example 3.

The ladder-type structure which results, as shown in Formula 8, is particularly valuable for cross-linking high temperature stable aryl-substituted organopolysiloxanes. For example, these materials may be utilized as cross-linking agents in the polymers described and claimed in my copending application Serial No. 421,595, assigned to the same assignee as the present invention, and in the copending application of Christian R. Sporck, Serial No. 160,272, filed December 18, 1961, and assigned to the same assignee as the present invention. For example, from about 1 to 10 percent of the composition of the present invention can be copolymerized with from 99 to 90 percent of the raw material utilized to form the linear aryl-substituted organopolysiloxane in my copending application. The result is a high temperature stable organopolysiloxane, less elastic than that formed in my copending application, but stronger, and consisting entirely of high temperature stable aryl-substituted polysiloxanes.

The previous examples are illustrative only of the compounds of the present invention and should not be considered as limiting in any way the full scope of the invention as covered in the appended claims.

What I claim as new and desire to secure by Letters Patent of the United States is:

1. An organopolysiloxane composition having the structure:

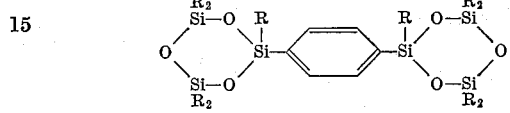

where R is a radical selected from the group consisting of phenyl and tolyl.

2. The organopolysiloxane composition of claim 1 wherein R is phenyl.

3. The organopolysiloxane composition of claim 2 wherein R is meta-tolyl.

4. A cross-linked organopolysiloxane material consisting essentially of recurring units of the formula:

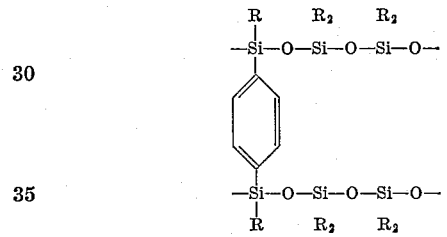

where R is a radical selected from the group consisting of phenyl and tolyl.

5. The organopolysiloxane of claim 4 wherein R is phenyl.

6. The organopolysiloxane of claim 4 wherein R is meta-tolyl.

References Cited by the Examiner

UNITED STATES PATENTS

| | | | |
|---|---|---|---|
| 2,709,692 | 5/1955 | Gainer | 260—46.5 |
| 2,762,827 | 9/1956 | Johannson | 260—46.5 |
| 2,766,220 | 10/1956 | Kantor | 260—46.5 |
| 3,135,777 | 6/1964 | Nielsen | 260—448.2 |
| 3,197,432 | 7/1965 | Lamoreaux | 260—46.5 |
| 3,202,634 | 8/1965 | Merker | 260—46.5 |
| 3,209,018 | 9/1965 | Merker | 260—46.5 |

OTHER REFERENCES

Nikitenkov, "Synthesis of Linear and Cyclolinear Organosilicon Compounds With Phenylenesiloxane Chains in the Molecule," Redstone Arsenal, Alabama.

LEON J. BERCOVITZ, *Primary Examiner.*

M. I. MARQUIS, *Assistant Examiner.*